Sept. 17, 1940. W. C. McGAVOCK 2,214,838
METHOD FOR CONDENSING SUBLIMED MATERIALS
Filed Nov. 5, 1938
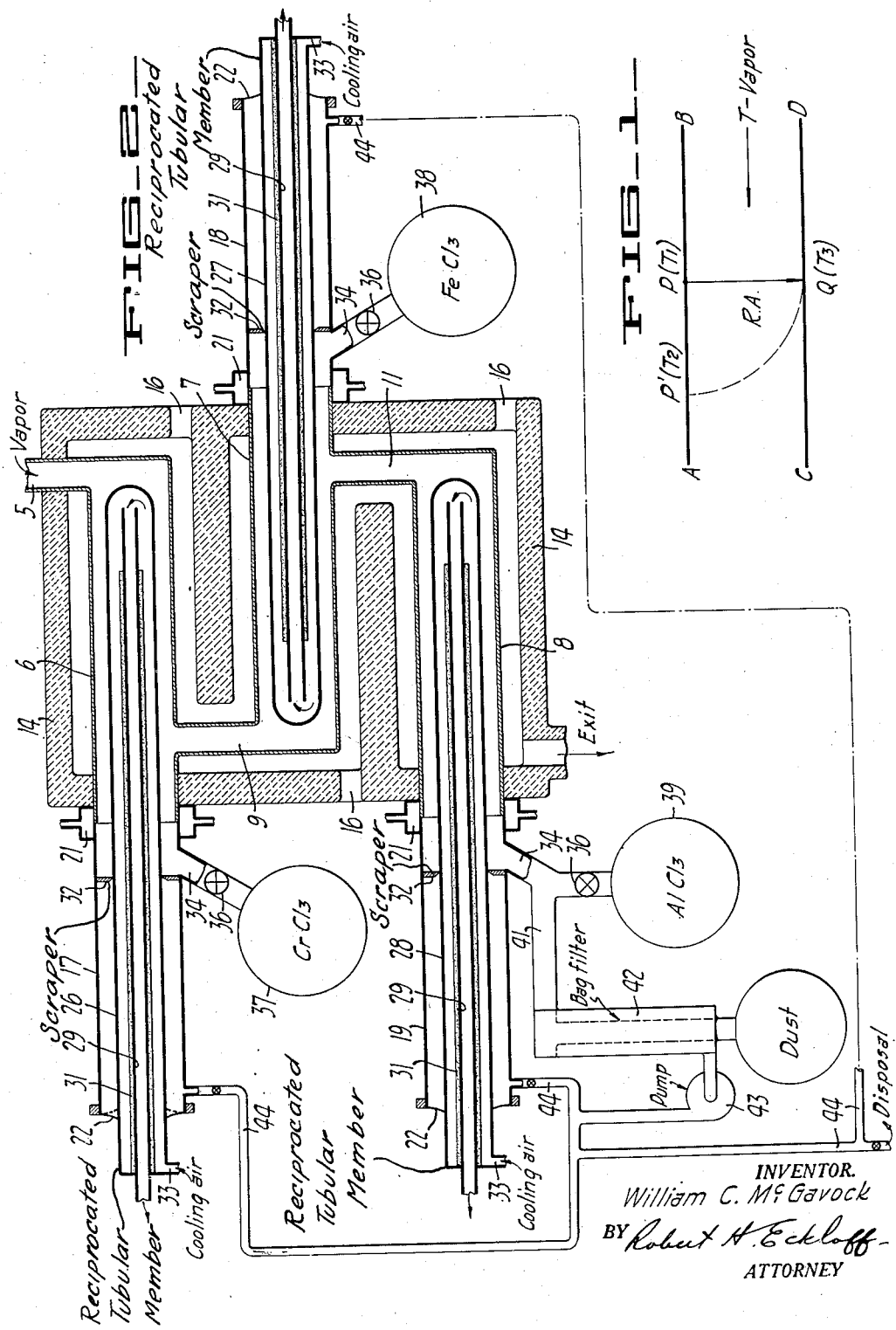
INVENTOR.
William C. McGavock
BY Robert H. Eckloff
ATTORNEY Patented Sept. 17, 1940

2,214,838

UNITED STATES PATENT OFFICE 2,214,838

METHOD FOR CONDENSING SUBLIMED MATERIALS

William C. McGavock, Berkeley, Calif., assignor, by mesne assignments, to The Dow Chemical Company, Midland, Mich., a corporation of Michigan Application November 5, 1938, Serial No. 239,059

10 Claims. (Cl. 23—87)

This invention relates to the continuous fractional condensing of one or more sublimed materials from the vapor state. It applies specifically to those substances having melting points near or above the normal sublimation temperatures, and which in consequence do not appear in the liquid state when condensed under pressures near normal atmosphere. It is especially useful in the technical condensation of vapors produced in the volatilization treatment of ores, as for example the fractional condensation and separation of mixed vapors of chromium, iron and aluminum chlorides produced during the high temperature chlorination of chromite ores, such as in the process disclosed in the United States Patents to Maier, No. 2,133,997 and No. 2,133,998, of October 25, 1938.

In practicing the inventions of the aforementioned Maier patents a high grade of chromic chloride was produced. Upon attempting to handle this product thereafter and particularly in later efforts to reduce this chloride to the metal with hydrogen certain difficulties arose. These were traced to the hygroscopic nature of ferric chloride present. Efforts to purify the mixed chlorides by washing and heating operations were not particularly successful. The process and apparatus of the present invention enable these mixed cholrides to be readily fractionated as solids with the chromic chloride containing less than 0.1% ferric chloride even when employing gases initially containing equal parts of these two chlorides.

While the invention is particularly applicable to the separation of chromic chloride from ferric and aluminum chlorides, and while it has special applicability thereto, it possesses broader application. For purposes of illustration, it will be described as applied to chromic chloride fractionation from ferric and aluminum chlorides but no limitation is to be implied therefrom.

This invention also relates to the continuous removing of condensed materials in the solid state from a stream of effluent gases which accidentally or necessarily contain constituents of a corrosive, noxious, or dangerous character. Thus, ferric and chromic chlorides, which dissociate thermally at high temperatures into ferrous and chromous chlorides and chlorine, must necessarily be condensed in the presence of elementary chlorine if decomposition is to be prevented, and such treatment can be readily accomplished by this invention.

Another object of this invention is to provide means enabling the temperatures and thermal gradients which determine the condensability of a vapor to be accurately controlled in a compact, uncorrodible, and continuously operating technical unit, and the accurate fractionation of the condensed material thereby assured.

Still another object of the invention is to provide means enabling substantially pure condensates of sublimed materials to be continuously removed from a condenser without stoppage or by-pass of the main stream of effluent gases and vapors produced and issuing from volatilization units.

Methods which have heretofore been used for the condensation of this type of material comprise three general classifications.

In the first of these the vapors and gases are led through one or more of a series of large chambers which are usually cooled atmospherically, and are lined with brick, or tile, or other inert materials. The disadvantages of large bulk and high first cost, the necessity for periodic cooling and removal of condensed material, and the difficulty of precise control of temperatures and temperature gradients are obvious, but it should be pointed out that such units are suited only when the temperature of condensation is relatively low, as for example in the manufacture of flowers of sulphur or sal ammoniac. Such structures could not be adequately maintained at temperatures suited for the fractional condensation of chromic chloride, requiring temperatures of 600–800° C.

In the second type the vapors are caused to impinge at high velocity upon a cooled metallic surface, and the finely divided condensate collected in a bag house. It is clear that such an installation is incapable of causing fractional condensation of mixed vapors, with mechanical separation of constituents having different sublimation temperatures, since all the condensable constituents are deposited simultaneously.

The third method which has been utilized is to introduce in the stream of vapor and gas a large volume of a coolant fluid, such as hydrogen gas, a spray of vaporizable liquids such as hydrocarbons or water, or some inert gas which has previously been cooled to a low temperature. This method cannot be used in many instances for chemical reasons, and cannot be readily adapted to fractional condensation, and inevitably involves serious dust problems due to the extreme fineness of the condensate produced.

All of these disadvantages of conventional methods are obviated by the practice of this invention.

The invention herein described is based upon a discovery relative to the manner in which two or more condensing walls or surfaces, both of which are at spatially varying temperatures lower than the dew point of a condensable vapor, collect condensate when subjected to a uniform flow of such vapor past their surfaces, and is illustrated by reference to Figure 1, a diagram employed in explaining the process of the invention.

Figure 2 is a view, partly schematic and partly in vertical section through a suitable apparatus embodying the present invention.

In Figure 1, A—B and C—D represent two walls or surfaces between which a condensable vapor is caused to flow in the direction of the arrow. At some point P consider an elementary condensing area at a temperature $T_1$, which is lower than the temperature of the vapor, which will be taken to be at its dew point T. Defining the radius of condensing action of the point or area P as the shortest distance to any other condensing wall or boundary, the radius of action RA is shown as the distance P—Q, the latter point is at a temperature $T_3$. It has been found that if, in the direction of flow of the condensable vapor, the radius of action laid off against A—B, i. e., P—P′, encounters no temperature gradient greater than $T_1$—$T_3$, the vapor will condense substantially only along C—D, i. e., when ($T_1$—$T_2$) is less than ($T_1$—$T_2$) no vapor condenses on A—B, even though it may be at lesser temperature at any point than the dew point of vapor in contact with it. In the foregoing, $T_3$ is the temperature at Q and $T_2$ is the temperature at P′.

In this connection it is to be pointed out that in such a system as is dealt with herein, there is no fixed dew point of the system as a whole throughout the apparatus. This should be apparent because concentrations of the various vaporized solids constantly change as sublimation and condensation occurs.

If these conditions are generalized through a condensing space, it is found that in two or more opposed condensing surfaces, if the lateral temperature gradient of one such surface is maintained everywhere less than the minimum transverse gradients from wall to wall, only the opposed surface will condense vapors. These criteria hold under all conditions except those in which the distances between A—B and C—D are excessive with respect to the steepness of the lateral gradient, or except when the temperature $T_1$ is so far below T that condensed material would no longer have any appreciable sublimation pressure. Temperature $T_1$ should therefore be such that at this temperature the condensed material has an appreciable sublimation pressure.

The criteria disclosed above make possible the design of a new type condenser for the fractional separation of sublimed solid materials. By maintaining the dimensions and temperature gradients within the limits required for the validity of the foregoing, it is possible to design a condenser consisting in essence of a fixed wall or duct, with a controlled temperature gradient, and a moving wall or duct opposed to it, having a temperature gradient mutually adjusted with respect to the stationary wall, so that condensed material will be deposited substantially only upon the moving parts.

The exact manner in which this may be done in a technically effective way will be illustrated by reference to a condenser which has been successfully applied to the continuous fractional condensation and separation of mixed chlorides of chromium, iron, and aluminum as produced in the high temperature chlorination of chromite ores according to the aforesaid patents. This condenser, having three stages of fractionation, is illustrated in Figure 2.

The gases from a suitable sublimation furnace, or from the exit 16 of the furnace or reaction chamber in said Maier patents, containing mixed vapors of chromium, iron and aluminum chlorides, as well as some elementary chlorine (10–15%) and diluent inert gases such as $CO_2$ (up to 40%), pass from inlet 5 through three horizontal cylindrical ducts, 6, 7 and 8, which are interconnected by vertical passages 9 and 11. The whole assembly is surrounded by a refractory furnace wall 14 containing suitably placed ports 16 through which heat is introduced or suitably removed so that the temperatures in the unit may be controlled. The ducts are preferably of fused silica construction.

Each of the three horizontal ducts is continued externally into a metallic extension 17, 18 and 19, each being connected thereto through a water-cooled cemented joint 21. The outer end of each extension includes a diaphragm or gland 22, which may be of rubber or other flexible material. Concentric with the ducts 6, 7 and 8, are three inner cylindrical condensing members 26, 27 and 28, also suitably made of silica, and each so arranged as to be capable of a reciprocating motion through the associated diaphragm or gland 22. Each condensing member carries an inner metallic duct 29, which is thermally insulated over the major portion of its interior length by a heat resistant coating 31. Into the annular space formed by each condenser tube and the duct 29, air is introduced through inlet 33 from an external source in quantities sufficient to give a required temperature to the condenser tube. Near the joint end of each extensions 17, 18 and 19 is an inner metallic scraper 32 having an orifice sufficient to pass smoothly the condenser tubes, and a downward sloping offtake vent 34 through which solid condensate formed on the condenser tube is discharged after removal by the scraper. The offtake vents connect with valves 36 and thence with separate containers 37, 38 and 39 for the collection of condensed $CrCl_3$, $FeCl_3$, and $AlCl_3$.

The last offtake vent 34 has, above the valve 36, a side vent 41 to an asbestos bag filter 42, which removes any mechanically entrained dust particles. The outlet from the filter is taken by a recirculating pump 43, and a part of the residual gas is returned in controlled amounts through duct 44 to the outer extensions 17, 18 and 19. The flow of these returned gases is so adjusted that the vapor-carrying hot gases carried by 6, 7 and 8 are prevented from penetrating the cold part of the extension by diffusion, and are instead diverted through the vertical connecting ducts to their normal path.

The mechanical elements which are provided by this design are—

1. A duct whose lateral temperature gradient is controllable by external heating (or cooling).
2. A condensing surface opposed to the duct surfaces, with further provision for controlling the transverse temperature gradient.
3. A special disposition of the above parts so that the lateral gradients are readily maintainable at less than the transverse gradients.

4. Means of removing the condensed materials from the moving condensing surface, and transferring them to external containers.

5. Means of preventing diffusion of hot gases containing uncondensed vapors into those parts of the apparatus required to be at low temperatures for mechanical reasons, and which cannot be adjusted to suitable condensing temperatures.

It is clear that these factors need only to be combined with the maintenance of suitable actual temperatures and temperature gradients to fulfill the conditions of operation which have been disclosed. Thus, for fractionally condensing $CrCl_3$, it has been found that the upstream part of the duct 6 should be near 850° C. and near the offtake for the first stage, near 550° C. Suitable temperatures for the condensing surface have been found to be correspondingly 800° C. and 500° C. at points directly opposite the 850° and 550° points above.

Thus the transverse gradient is 50° C. It has been found empirically that this gradient should not be more than 100° and not less than 30°. More specifically, using the radius of condensing action as previously defined as the unit, the lateral gradient is maintained at substantially 30° per unit radius of action, while the transverse gradient is never less than 30° per unit radius, and is kept as near to 50° per unit as can be practically maintained.

Similarly, in the second or ferric chloride stage, the duct temperatures are controlled from 550° to 200° C., and the condensing temperatures from 500° to 150°. Here the lateral gradient is 35° per unit radius of action, and the transverse again 50° per unit radius.

Finally in the third stage, the duct temperatures are adjusted to 200° to 75° C., a lateral gradient of 12.5° per unit of radius action, with the transverse gradient again 50°.

It should be emphasized that the control of temperature gradients according to the above specific conditions is more than a mere adjustment of the outer duct temperature to a point above the dew point, and the inner to a temperature below the dew point, because there is no fixed dew point in the system. It is, of course, mechanically impossible to build a fractional condensing unit which does not involve temperature gradients, since material must be transferred through a zone from its initial dew point to some lower discharge temperature. As material condenses, the partial pressures of the various constituents will vary in a manner which cannot be predicted in terms suitable for control purposes, and in consequence the dew point changes according to relationships which are not explicit. The principle of the relationship of transverse to lateral gradients is an empirical discovery which serves as a practical guide for the proportionment of the dimensions and temperatures of the condensing unit, and enables satisfactory operation without specific knowledge as to the instantaneous partial pressure of the vapors at each point of the condensing surface.

The actual temperatures involved do, however, determine the accuracy of the fractionation, when considered in relationship to the sublimation pressures of the materials being condensed. In the instance of chromic chloride, when the volatility is dependent upon the partial pressure of chlorine, as well as the actual vapor pressure, due to the reversible formation of $CrCl_4$, this further factor must be considered. Thus, for example, at the lowest condensing temperature of the first stage (500° C.), the maximum "apparent" partial pressure of chromium chloride will be not more than about 5/1000 parts of an atmosphere, when the residual vapor is chlorine. Then if the original gas had a partial pressure of chromium chloride corresponding to 50%, less than one percent of the original chromium would pass the first stage and be deposited with the iron of the second stage. If, however, 550° were chosen as the end condensing temperature of the first stage, the partial pressure of chromium chlorides passing might be as high as 1.5%, and the corresponding possible loss up to 3%.

Similar conditions, corresponding to the appropriate, and well known vapor pressures of ferric and aluminum chlorides, obtain for the second and third stages. It will be apparent, however, that it may be desirable, in case more accurate fractionation of product is desired, to increase the number of stages of condensation shown, and such an extension of the apparatus will occur by mere duplication of stages. This will decrease the lateral gradients, and so long as the general criteria are maintained, effective operation will be assured, with increasing accuracy of separation of each fraction produced. In certain instances, where the vapor pressures are not far apart on the temperature scale, certain "middling" or mixed products may be produced in certain stages, and it may be desired to return these intermediate products to the sublimation furnace for further fractionation. Nevertheless, the degree of separation attained is greatly enhanced over previous methods known to the art, because of the accurate control of the gradients of the condenser, as is illustrated by the fact that it has been practical in the actual operation of an experimental unit designed as above, to secure a chromic chloride condensate containing only 0.1 to 0.3% iron chloride, where the vapors being treated had originally approximately equal parts of iron and chromium chlorides in the gaseous state.

The specific temperatures given pertain particularly to gases issuing from a retort operated according to the Maier patents and containing from 40% to 60% $CO_2$, 10% to 15% $Cl_2$ and the remainder sublimed chlorides. Under these conditions, the initial dewpoint of the $CrCl_3$ is depressed approximately 75° C. by the dilution effect of the $CO_2$ acting as an inert gas and altering the partial pressures of condensable vapors. Should it be desirable to utilize this invention for vapors carrying other quantities or free entirely of non-condensables, an appropriate shift of the absolute temperatures at ingress and egress may be required. These are obviously determinable from consideration of the sublimation pressures of the materials involved, and the particular dilution in question. Thus if one re-sublimes the totally condensed chloride mixture from the Maier retort, in an apparatus not directly connected to the chlorination retort, a normal ingress temperature of 900°–925° C. is required and if the corresponding egress temperature is raised by a similar amount (50°–75° C.) an equivalent extraction will be obtained. On the other hand, should it be desired to condense sublimed chlorides from more dilute vapors it will be necessary to decrease the absolute temperatures involved in a manner corresponding to lowering of the dewpoint by the dilution.

Those versed in the art will have no difficulty in applying the principles disclosed to variant types of equipment which may be required for special purposes but which all come within the scope of the invention. The method is obviously not limited to the separation of the chlorides of iron, chromium, and aluminum, but may be applied to any solid materials which sublime without fusion, provided there is an appreciable difference in their normal sublimation pressures or temperatures.

Thus, further, some may desire, or need to apply electric heating instead of fuel firing, and in other cases the ports 16 may even require the admission of cooling air rather than heating gases. Accessory ports may be required in other designs. Advantage may also be taken of the varying gas densities involved in the condenser passages to aid or retard natural draft by constructing the ducts at an angle with the horizontal. Such variations, as well as changes of materials of construction, will be obvious and can be made within this invention.

The term "dewpoint" may be considered by some as referring only to water and water vapor. Since the term is employed herein I wish to define its meaning and application herein.

The dewpoints of the vapors are the temperatures at which the sublimation pressures of the respective chlorides in equilibrium with the solid chlorides are equal to the actual partial pressures of the particular chloride vapors existing at any point. Fixed gases, by altering partial pressure, can and do affect the dewpoint temperature.

Because of accurate control of temperature and gradients, crystals normally grow to large size. By varying periodicity of removal of condensed material, a product of uniform and selected crystal size can be secured. A one minute to three minute scraping interval for example gives crystals of acceptable size. It is desirable to scrape frequently for otherwise heat transfer is impaired and vapors pass through without condensing.

I claim:

1. A process for separating chromic trichloride from ferric chloride to produce substantially pure iron free chromium chloride, the process comprising passing a gaseous mixture of said chlorides to a passageway defined by spaced surfaces confining said mixture, maintaining one of said surfaces at a first temperature approximately equal to the initial dewpoint of chromic trichloride adjacent to the point of ingress of said mixture and at a second temperature approximating that at which the vapor pressure of chromic trichloride is negligible adjacent to the point of egress of said mixture, maintaining said other surface at said points respectively at temperatures approximating 50° C. in excess of said first and said second temperatures to condense substantially only said chromic chloride substantially only on said one surface and leave a residual gas substantially free of chromic chloride, and removing condensed chromic chloride from said one surface.

2. A process for separating chromic trichloride from ferric chloride to produce substantially pure iron free chromium chloride, the process comprising passing a gaseous mixture of said chlorides to a passageway defined by spaced surfaces confining said mixture, maintaining one of said surfaces at a first temperature approximately equal to the initial dewpoint of chromic trichloride adjacent to the point of ingress of said mixture and at a second temperature approximating that at which the vapor pressure of chromic trichloride is negligible adjacent to the point of egress of said mixture, maintaining said other surface at said points respectively at temperatures exceeding said first mentioned temperatures by at least 30° C. and not more than 100° C. to condense substantially only said chromic chloride substantially only on said one surface and leave a residual gas substantially free of chromic chloride, and removing condensed chromic chloride from said one surface.

3. A process for separating chromic trichloride from ferric chloride to produce substantially pure iron free chromium chloride, the process comprising passing a gaseous mixture of said chlorides to a passageway defined by spaced surfaces confining said mixture, maintaining one of said surfaces at a first temperature approximately equal to the initial dewpoint of chromic trichloride adjacent to the point of ingress of said mixture and at a second temperature approximating that at which the vapor pressure of chromic trichloride is negligible adjacent to the point of egress of said mixture, maintaining said other surface at said points respectively at temperatures approximately 50° C. in excess of said first and said second temperatures and simultaneously maintaining a transverse temperature difference measured between a point on one of said surfaces and a point on the other surface opposite to the first mentioned point of at least 30° C. and a lateral temperature drop along said warmer surface, over a distance equal to that between said surfaces, less than said transverse temperature difference to condense substantially only said chromic chloride substantially only on said one surface and leave a residual gas substantially free of chromic chloride, and removing condensed chromic chloride from said one surface.

4. A process for separating chromic trichloride from ferric chloride to produce substantially pure iron free chromium chloride, the process comprising passing a gaseous mixture of said chlorides to a passageway defined by spaced surfaces confining said mixture, maintaining one of said surfaces at a first temperature approximately equal to the initial dewpoint of chromic trichloride adjacent to the point of ingress of said mixture and at a second temperature approximating that at which the vapor pressure of chromic trichloride is negligible adjacent to the point of egress of said mixture, maintaining said other surface at said points respectively at temperatures exceeding said first mentioned temperatures by at least 30° C. and not more than 100° C. and simultaneously maintaining a transverse temperature difference measured between a point on one of said surfaces at a point opposite to the first mentioned point and on the warmer surface of at least 30° C. and a lateral temperature drop along said warmer surface, over a distance equal to that between said surfaces, less than said transverse temperature difference to condense substantially only said cromic chloride substantially only on said one surface and leave a residual gas substantially free of chromic chloride, and removing condensed chromic chloride from said one surface.

5. A method for fractionally condensing as a solid a first material from the vapor state in which it is in the presence of an appreciable quantity of one or more other materials in the vapor state and which are also capable of condensing as solids, said method comprising maintaining a passageway defined by two closely adjacent opposed surfaces in a temperature zone in which said condensed solid first material has an appreciable sublimation pressure, maintaining a thermal gradient along one of said surfaces in the direction of flow of gas thereover and over a distance along said one surface equal to the distance between said surfaces, said gradient being of a value less than the minimum temperature drop between said closely adjacent surfaces to secure condensation substantially only on said one surface, any selected point on said one surface being maintained (1) at a temperature above the condensing temperatures of said other materials and (2) below the condensing temperature of said first material, and removing from said one surface material condensed thereon.

6. A process as in claim 3 in which the gaseous mixture of chromic trichloride and ferric chloride includes about 40% $CO_2$ and about 10% $Cl_2$ and the first temperature approximates 800° C. and the second temperature approximates 500° C.

7. A process as in claim 4 in which the gaseous mixture of chromic trichloride and ferric chloride includes about 40% $CO_2$ and about 10% $Cl_2$ and the first temperature approximates 800° C. and the second temperature approximates 500° C.

8. A process as in claim 3 in which the gaseous mixture is derived by subliming a mixture of solid chromic chloride, ferric chloride and aluminum chloride and the first temperature approximates 850° C. and the second temperature approximates 550° C.

9. A process as in claim 4 in which the gaseous mixture is derived by subliming a mixture of solid chromic chloride, ferric chloride and aluminum chloride and the first temperature approximates 850° C. and the second temperature approximates 550° C.

10. A method for fractionally condensing on a selected surface as a solid a first material from the vapor state in which it is in the presence of an appreciable quantity of one or more other materials in the vapor state and which are also capable of condensing as solids, said method comprising maintaining a closed passageway defined by at least two closely adjacent opposed surfaces in a zone in which said surfaces are maintained at different temperatures and in which the condensed solid first material has an appreciable sublimation pressure at the maximum temperature on the warmer of said surfaces in said zone, maintaining a negative thermal gradient along said surfaces in the direction of flow of gas thereover, said gradient being of such a value that the temperature drop in a distance equal to that separating the surfaces is of a value less than the minimum temperature drop between corresponding opposite points on the surfaces to secure condensation substantially only on the colder surface as the selected surface, any selected point on said colder surface being maintained (1) at a temperature above the condensing temperatures of said other materials and (2) below the condensing temperature of said first material, and removing from said selected surface the said first material condensed thereon.

WILLIAM C. McGAVOCK.